No. 812,915. PATENTED FEB. 20, 1906.
A. BERRY.
JOURNAL LUBRICATOR.
APPLICATION FILED DEC. 27, 1904.

Witnesses
R. S. Smart
W. A. Wyman

Inventor
Austen Berry
by
Fred Fahnestock
Atty

UNITED STATES PATENT OFFICE.

AUSTIN BERRY, OF OTTAWA, CANADA.

JOURNAL-LUBRICATOR.

No. 812,915.  Specification of Letters Patent.  Patented Feb. 20, 1906.

Application filed December 27, 1904. Serial No. 238,509.

*To all whom it may concern:*

Be it known that I, AUSTIN BERRY, of the city of Ottawa, in the county of Carleton, Province of Ontario, Canada, have invented certain new and useful Improvements in Journal-Lubricators; and I do hereby declare that the following is a full, clear, and exact description of the same.

My invention relates to improvements in journal-lubricators; and the objects of my invention are to provide a device of this class of cheap and simple construction which will continuously provide oil to the journal when running, further objects being to do away with the various mechanical weaknesses found in previous types of oilers; and it consists, essentially, of a pin integral with the journal, a downwardly-extending arm rotatably supported on the same, a lubricating-wheel supported on a shaft secured to the said arm, a gearing supported by the arm for transmitting the motion of the journal to the lubricating device, the various parts of the device being constructed and arranged in detail as hereinafter more particularly described.

Figure 1:
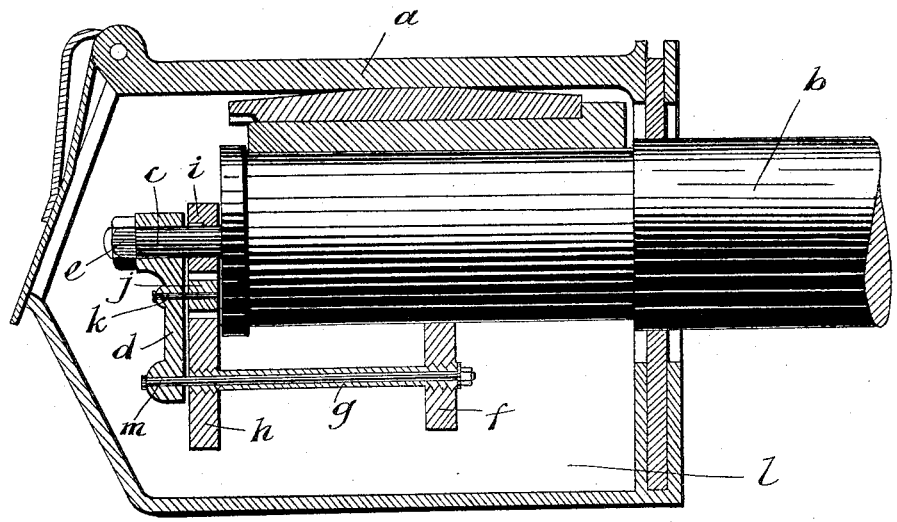
Figure 2:
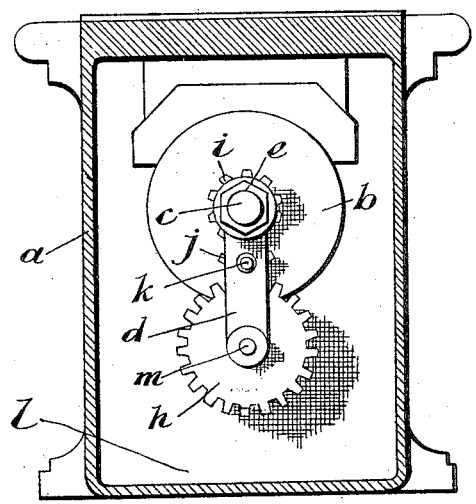

Figure 1 shows a sectional elevation of my lubricator. Fig. 2 shows an end view of the same, a part of the box being broken away and in section to more clearly show the construction of the same.

In the drawings like letters of reference indicate corresponding parts in each figure.

$a$ is the journal-box, which may be of any ordinary construction, and $b$ is the journal extending into the same.

$c$ is the pin, made integral with the end of the journal. $d$ is a downwardly-extending arm loosely supported upon the said pin. A nut $e$ or other suitable device may be provided on the end of the pin to prevent the arm slipping out of place.

$f$ is the lubricating-wheel, constructed of any suitable material. This wheel $f$ has a sleeve $g$ secured thereto. $h$ is a gear-wheel secured to the other end of the said sleeve.

$m$ is a shaft secured to the arm $d$ and adapted to extend through the sleeve $g$, and so support the gear-wheel $h$ and the wheel $f$.

The gear-wheel $h$ is suitably geared to the pin, so that the rotating motion of the journal may be transmitted thereto. This may be accomplished in a variety of gears that I have shown, consisting of a gear-wheel $i$, secured with a key or other suitable means to the pin and connected by an idler $j$ to the wheel $h$. A shaft $k$, secured to the arm $d$, extends through the said idler $j$ and supports it. The bottom portion $l$ of the box may be filled with oil, so that the wheel $f$ dips therein.

It will thus be seen that when the journal is in motion oil will be continuously supplied to the journal.

It is to be noted that the gearing transmitting the motion of the journal to the lubricating-wheel $f$ is preferably such that the wheel $f$ will run much slower than the journal.

It will thus be seen that I have devised a lubricating device of cheap and simple construction which will continuously lubricate the journal whenever it is in motion. It will not get out of order and may easily be applied to all forms of journals.

It is to be understood that in carrying out my device various changes may be made in the details of construction without materially departing from the spirit of my invention.

What I claim as my inventon is—

1. In a device of the class described the combination with the journal-box, and the journal, of a pin integral and axial with the end of the journal a lubricating device and means wholly out of contact with the journal-box for supporting said lubricating device from said axial pin substantially as described.

2. In a device of the class described the combination with the journal of a pin axial and integral with the end thereof a downwardly-extending arm loosely supported by the said pin, a lubricating-wheel supported by the said arm, means independent of the arm for transmitting the motion of the journal to the said wheel substantially as described.

3. In a device of the class described the combination with the journal of a pin integral with the end thereof, a downwardly-extending arm loosely supported by the same, a shaft supported by the arm, a sleeve supported by the said shaft, a gear-wheel fixed to the said sleeve, gearing for transmitting the motion of the journal to the said gear-wheel and means on the sleeve for bringing and applying the lubricant to the under side of the journal.

4. In a device of the class described the combination with the journal of a pin integral with the end thereof, a downwardly-extending arm loosely supported by the same, a shaft supported by the arm, a sleeve supported by the said shaft, a gear-wheel fixed to the said sleeve, gearing for transmitting the motion of the journal to the said gear-wheel and a lubricating-wheel on the said sleeve adapted to bring and apply the lubricant to the under side of the journal.

5. In combination in a device of the class described, an axle or journal having an axial pin extending therefrom, an arm loosely supported on the said pin, a shaft supported on the arm, a sleeve on the said shaft, a lubricating-wheel carried by the sleeve and gearing between the said sleeve and the axial pin of the journal, substantially as described.

Signed at the city of Ottawa, in the Province of Ontario, this 21st day of December, 1904.

AUSTIN BERRY.

Witnesses:
RUSSEL S. SMART,
A. WILSON.